United States Patent
Cheng

(10) Patent No.: US 12,212,674 B2
(45) Date of Patent: Jan. 28, 2025

(54) METHOD FOR EXCHANGING DATA AND NON-TRANSITORY COMPUTER-READABLE MEDIUM AND SYSTEM THEREOF

(71) Applicant: LNDATA, INC., Taipei (TW)

(72) Inventor: Ming-Chieh Cheng, Taipei (TW)

(73) Assignee: LNDATA, INC., Taipei (TW)

( * ) Notice: Subject to any disclaimer, the term of this patent is extended or adjusted under 35 U.S.C. 154(b) by 292 days.

(21) Appl. No.: 17/959,322

(22) Filed: Oct. 4, 2022

(65) Prior Publication Data
US 2024/0113876 A1 Apr. 4, 2024

(51) Int. Cl.
*H04L 9/40* (2022.01)
*H04L 9/14* (2006.01)

(52) U.S. Cl.
CPC ............ *H04L 9/14* (2013.01); *H04L 63/0442* (2013.01)

(58) Field of Classification Search
CPC ......... H04L 9/083; H04L 9/14; H04L 9/3263; H04L 63/0435; H04L 63/0442; H04L 63/061; H04L 63/062; H04L 63/0823
See application file for complete search history.

(56) References Cited

U.S. PATENT DOCUMENTS 11,310,207 B1 * 4/2022 Davey ................ H04L 63/0428

* cited by examiner

*Primary Examiner* — Minh Dinh

(57) ABSTRACT

A method for performing a data exchanging process to exchange data includes the following steps: establishing a data operating unit, transferring an encryption key to a first terminal, receiving first data encrypted according to the encryption key from the first terminal, combining first subset data of the first data and second subset data of second data encrypted according to the encryption key in the data operating unit to form result data wherein the first subset data and the second subset data respectively have a common identifier, delivering the result data to the first terminal and terminating the data operating unit. Besides, a non-transitory computer-readable medium and a system to perform the method are disclosed.

20 Claims, 9 Drawing Sheets

400

First Terminal — 410

| ID | Email | City |
|---|---|---|
| A1 | u1@email.com | Taipei |
| A2 | u2@email.com | Tainan |
| A3 | u3@email.com | Kaohsiung |

Second Terminal — 420

| ID | Email | Interest |
|---|---|---|
| B1 | u1@email.com | soccer |
| B2 | u2@email.com | comic |
| B3 | u3@email.com | baseball |

First Terminal ← 510

| ID | Email | City |
|---|---|---|
| A1 | 13f1UY$T8a | Taipei |
| A2 | lk2m$#8ads | Tainan |
| A3 | p.09&12a*x | Kaohsiung |

Second Terminal ← 520

| ID | Email | Interest |
|---|---|---|
| B1 | 13f1UY$T8a | soccer |
| B2 | lk2m$#8ads | comic |
| B3 | p.09&12a*x | baseball |

FIG. 5

| Cloud Service | | |
|---|---|---|
| Token | City | Interest |
| 13f1UY$T8a | Taipei | soccer |
| lk2m$#8ads | Tainan | comic |
| p.09&12a*x | Kaohsiung | baseball |

METHOD FOR EXCHANGING DATA AND NON-TRANSITORY COMPUTER-READABLE MEDIUM AND SYSTEM THEREOF

BACKGROUND OF THE INVENTION

1. Field of the Invention

The present disclosure relates to a method for exchanging data, a non-transitory computer readable medium and a system, and in particular to a method allowing different users to exchange sensitive data and capable of improving data protection, and a non-transitory computer readable medium and a system to perform the method.

2. Description of the Related Art

Advertisement is a widely used commercial marketing tool in daily lives. Generally, vendors tend to investigate information such as ages, genders, residences and interests of target audiences to sell goods before purchasing ads to cast from an advertising agency. Based on the information, the vendors are able to target customers who are willing and have commensurate spending abilities more precisely and get a greater advertising revenue. Therefore, various information of consumers has huge potential commercial value for most businesses.

Taking online advertising for example, vendors may buy ads in advance from internet service providers such as social community sites, video platforms, searching engines or news sites having regular users, and emphasize the corresponding characteristics of the consumers targeted to sell goods when buying the ads. After receiving the advertising commission, the internet service providers will summarize the characteristics of the targeted users based on the personal data the users agree the internet service providers to use and the users' browsing data, so that the bought ads will be casted when the users with the corresponding characteristics are browsing to increase willingness to purchase the advertised goods.

However, users' browsing data is often indistinguishable from their sensitive personal data. Most conventional internet service providers utilize cookies stored in clients' terminals as the bases for visiting the websites when collecting browsing data. Nonetheless, in General Data Protection Regulation (GDPR) made by EU, browser cookies, IP addresses, mobile device IDs and social network activity records have been listed as personal data and need to be pseudonymized or anonymized, since severe harm will be caused to users' privacy if the data is hacked or stolen by malicious people. Therefore, some internet service providers claim that they will stop using cookies in the near future, and instead will create customized models based on the users' long-term browsing activities to define characteristics of the users. This approach has some shortcomings: (1) In the future, vendors can only purchase ads from specific internet service providers and cannot verify the accuracy of the models created by the providers. (2) User groups of each internet service have few overlaps, so the increased income will be limited if the consumers' information obtained from a web site A is applied to a web site B. (3) Since the models are created based on the users' long-term browsing activities, when the users change their consumption habits in a short time or have different desires against the past consumption modes, the models are incapable of accurately capturing such dynamic changes or implicit characteristics, so the efficiencies of casting ads are lowered.

BRIEF SUMMARY OF THE INVENTION

Aspects and advantages of embodiments of the present disclosure will be set forth in part in the following description, or may be learned from the description, or may be learned through practice of the embodiments.

An example aspect of the present disclosure is directed to a method for performing a data exchanging process to exchange data. The method includes the following steps: establishing a data operating unit, transferring an encryption key to a first terminal, receiving first data encrypted according to the encryption key from the first terminal, combining first subset data of the first data and second subset data of second data encrypted according to the encryption key in the data operating unit to form result data wherein the first subset data and the second subset data respectively have a common identifier, delivering the result data to the first terminal and terminating the data operating unit.

In some implementations, the method further includes the following steps: providing a data exchanging transaction, transferring a one-time certificate to a first trading terminal participating in the data exchanging transaction, receiving the one-time certificate from an undetermined terminal and authenticating the undetermined terminal as the first terminal.

In some implementations, the method further includes the following step: establishing a data operating mechanism based on data chosen for trade in the data exchanging transaction by the first trading terminal or sample data provided by the first terminal. The step of combining the first subset data and the second subset data in the data operating unit to form the result data includes defining an encrypted content of the first data and the second data as an identifier respectively, defining an identical identifier among the first data and the second data as the common identifier, defining subset data corresponding to the common identifier of the first data and the second data as the first subset data and the second subset data respectively and combining the first subset data and the second subset data and assigning a de-identified tag to the common identifier to form the result data.

In some implementations, the method further includes the following steps: modifying the data operating mechanism during the step of combining the first subset data and the second subset data in the data operating unit to form the result data or during a plurality of data exchanging processes in which the first terminal participates, assigning a customized tag to a customized identifier of the first data and the second data respectively according to modified data operating mechanism and incorporating the customized identifiers and the customized tags among the first data and the second data into the result data.

In some implementations, the step of transferring the encryption key to the first terminal includes transferring a permanent certificate to the first terminal. The step of delivering the result data to the first terminal includes storing the result data into a metadata database, receiving a read request from the first terminal with the permanent certificate and constructing a communication protocol between the first terminal and the metadata database.

In some implementations, the method further includes the following step: executing a data protecting configuration to reject access to the data operating unit excepted from the first terminal, the metadata database and a second terminal providing the second data.

In some implementations, the method further includes the following steps: establishing a decryption key and an intelligent contract and separating the decryption key into a first subkey and a second subkey. The step of delivering the result data to the first terminal includes transferring the result data and the first subkey to the first terminal and transferring the intelligent contract and the second subkey to the first terminal after receiving a confirmation message and/or a payment notification from the first terminal.

Another example aspect of the present disclosure is directed to a non-transitory computer readable medium having stored therein instructions. When executed by a computing device, the instructions cause the computing device to perform operations including establishing a data operating unit, transferring an encryption key to a first terminal, receiving first data encrypted according to the encryption key from the first terminal, combining first subset data of the first data and second subset data of second data encrypted according to the encryption key in the data operating unit to form result data wherein the first subset data and the second subset data respectively have a common identifier, delivering the result data to the first terminal and terminating the data operating unit.

Still another example aspect of the present disclosure is directed to a system. The system includes a processor and a memory coupled to the processor. The memory is configured to store instructions executable by the processor to cause the processor to perform operations including establishing a data operating unit, transferring an encryption key to a first terminal, receiving first data encrypted according to the encryption key from the first terminal, combining first subset data of the first data and second subset data of second data encrypted according to the encryption key in the data operating unit to form result data wherein the first subset data and the second subset data respectively have a common identifier, delivering the result data to the first terminal and terminating the data operating unit.

In some implementations, the operations further include providing a data exchanging transaction, transferring a one-time certificate to a first trading terminal participating in the data exchanging transaction, receiving the one-time certificate from an undetermined terminal and authenticating the undetermined terminal as the first terminal.

In some implementations, the operations further include establishing a data operating mechanism based on data chosen for trade in the data exchanging transaction by the first trading terminal or sample data provided by the first terminal, defining an encrypted content of the first data and the second data as an identifier respectively, defining an identical identifier among the first data and the second data as the common identifier and defining subset data corresponding to the common identifier of the first data and the second data as the first subset data and the second subset data respectively, and combining the first subset data and the second subset data, and assigning a de-identified tag to the common identifier to form the result data.

In some implementations, the operations further include modifying the data operating mechanism during the operation of combining the first subset data and the second subset data in the data operating unit to form the result data or during a plurality of data exchanging processes in which the first terminal participates, assigning a customized tag to a customized identifier of the first data and the second data respectively according to modified data operating mechanism and incorporating the customized identifiers and the customized tags among the first data and the second data into the result data.

In some implementations, the operations further include transferring a permanent certificate to the first terminal, storing the result data into a metadata database, receiving a read request from the first terminal with the permanent certificate and constructing a communication protocol between the first terminal and the metadata database.

In some implementations, the operations further include executing a data protecting configuration to reject access to the data operating unit excepted from the first terminal, the metadata database and a second terminal providing the second data.

In some implementations, the operations further include establishing a decryption key and an intelligent contract, separating the decryption key into a first subkey and a second subkey, transferring the result data and the first subkey to the first terminal and transferring the intelligent contract and the second subkey to the first terminal after receiving a confirmation message and/or a payment notification from the first terminal.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4 illustrates original data in a method for exchanging data according to some exemplary embodiments.

FIG. 5 illustrates encrypted data encrypted from the original data in FIG. 4 according to some exemplary embodiments.

FIG. 6 illustrates result data formed by first subset data and second subset data in FIG. 5 according to some exemplary embodiments.

DETAILED DESCRIPTION OF THE INVENTION

Figure 1:
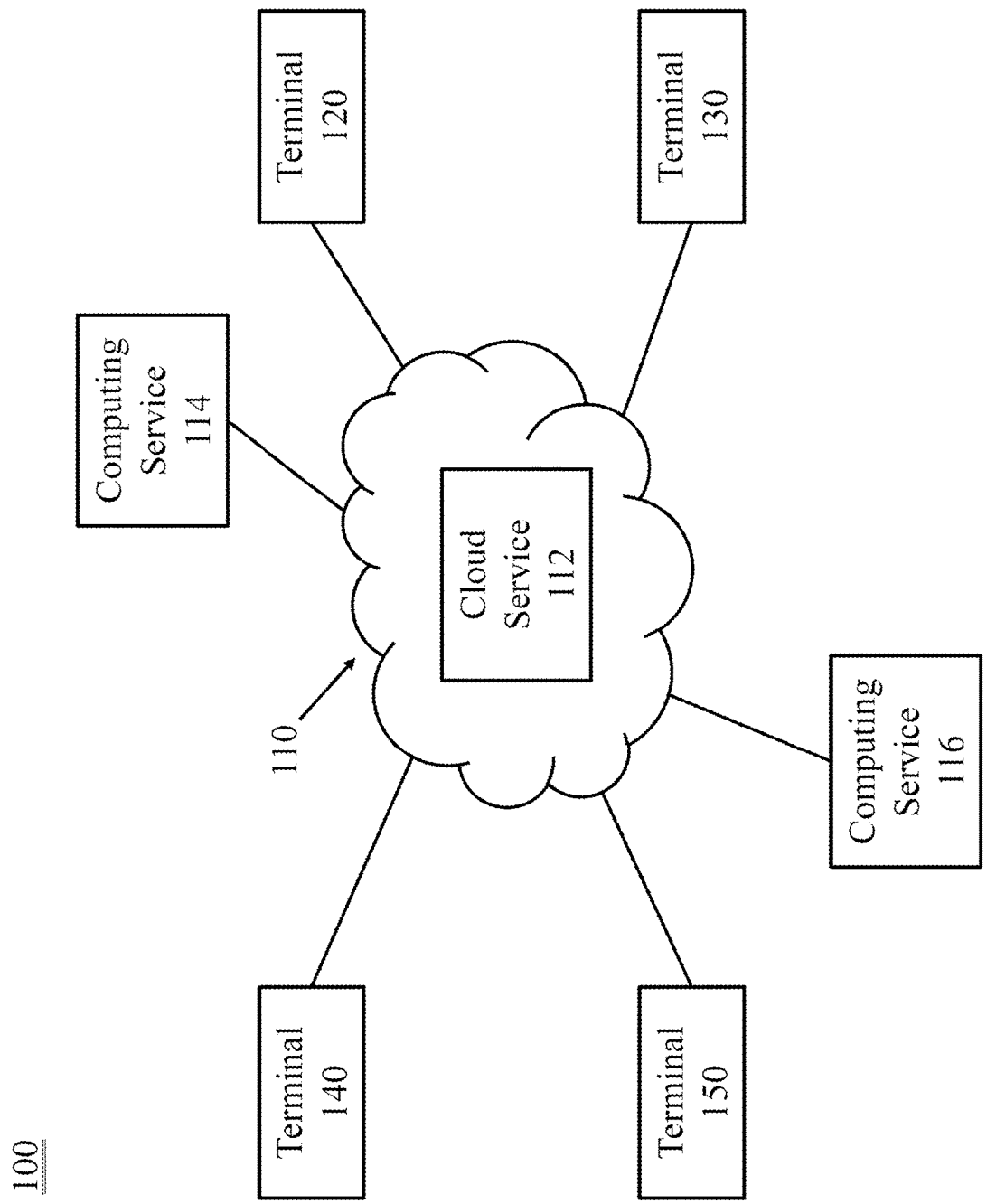
FIG. 1 illustrates a system for exchanging data according to some exemplary embodiments.

The aforementioned and other technical features, characteristics and effects of the present disclosure may be clearly presented by the detailed description of exemplary embodiments together with the attached figures. In addition, in the following embodiments, the same or similar components will use the same or similar reference numerals.

In addition, the methods, processes and steps disclosed by the embodiments are only illustrative and not intended to limit. Therefore, a person skilled in the art can appropriately increase, omit, modify or execute each method, process or step alone without departing from the spirit and the scope of the invention, unless the change results in timing or technical inconsistencies. Besides, the orders of each method, process or step can also be altered or adjusted.

Figure 2:
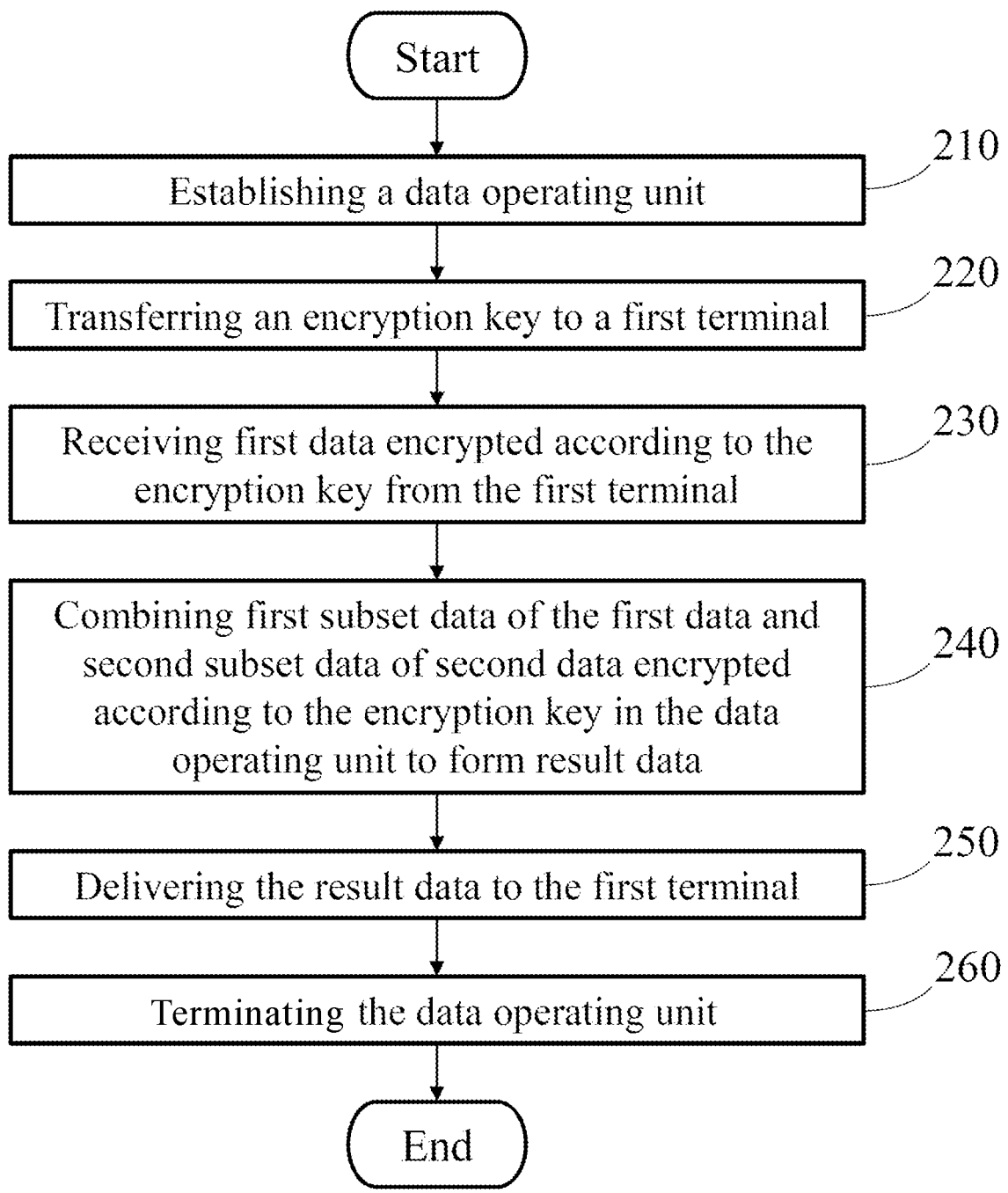
FIG. 2 is a block diagram of a method for exchanging data according to some exemplary embodiments.

Referring to FIG. 1 and FIG. 2, FIG. 1 illustrates a system for exchanging data according to some exemplary embodiments, and FIG. 2 is a block diagram of a method for exchanging data according to some exemplary embodiments. As shown in FIG. 1, a system 100 for exchanging data may exemplarily include a cloud 110 and a plurality of terminals. The cloud 110 may include a cloud service 112 and computing services 114, 116. The terminals exemplarily include terminals 120, 130, 140 and 150 that are coupled to the cloud 110. Thereby, each terminal is able to exchange data and interact with the cloud 110, and further to exchange data and interact with other terminals through the cloud service 112. It is noted that the terminals 120, 130, 140 and 150 may be but are not limited to tablets, personal computers, commercial computers, servers or portable electronic devices belonging to various users, and each terminal can be in same or different locations.

In some embodiments, the cloud service 112 may select one or more terminals to interact for performing a data exchanging process. For example, the cloud service 112 may include a processor and a memory. The memory is coupled to the processor and configured to store instructions therein. The instructions are executable by the processor and/or computable through the computing services 114 and 116 to cause the processor to perform the operations or steps of the method for exchanging data shown in FIG. 2. The steps or operations include establishing a data operating unit (step 210), transferring an encryption key to a first terminal (step 220), receiving first data encrypted according to the encryption key from the first terminal (step 230), combining first subset data of the first data and second subset data of second data encrypted according to the encryption key in the data operating unit to form result data (step 240) wherein the first subset data and the second subset data respectively have a common identifier, delivering the result data to the first terminal (step 250) and terminating the data operating unit (step 260).

Figure 3:
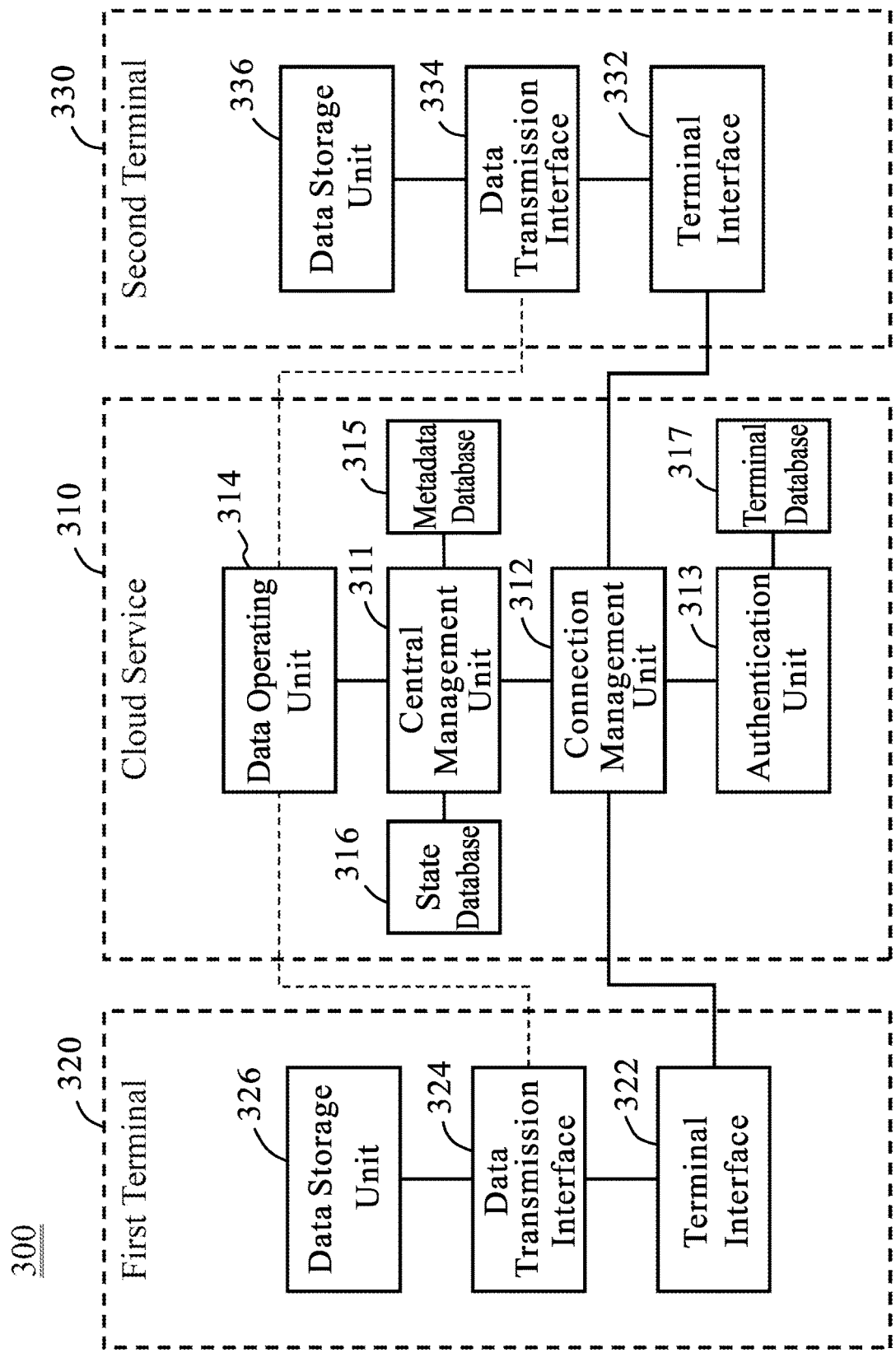
FIG. 3 is a schematic diagram of a system for exchanging data according to some exemplary embodiments.

Referring to FIG. 3, FIG. 3 is a schematic diagram of a system for exchanging data according to some exemplary embodiments. As shown in FIG. 3, the cloud service 310 of the system 300 can be regarded as a platform providing data exchanging services and allowing a first terminal 320 to exchange data with a second terminal 330. Specifically, the cloud service 310 may include a central management unit 311, a connection management unit 312 and an authentication unit 313. The central management unit 311 may be configured to establish a data operating unit 314 for performing the following data exchanging processes. Optionally, the cloud service 310 may also include a metadata database 315 and a state database 316 communicably connected to the central management unit 311. The metadata database 315 may be a relational database configured to store metadata corresponding to the exchanging or exchanged data, and the state database 316 may be an in-memory database configured to record states of each operation during data exchanging processes. The connection management unit 312 is communicably connected to the central management unit 311 and configured to play a role as connection bridges between each terminal and the cloud service 310. The authentication unit 313 is communicably connected to the connection management unit 312 and configured to determine whether each terminal communicably connected to the cloud service 310 is an authenticated user by the cloud service 310, and generate and assign certificates for various connections. Optionally, the cloud service 310 may also include a terminal database 317 communicably connected to the authentication unit 313. The terminal database 317 may be a relational database configured to store information such as users' accounts, their hashed passwords and information like organizations belonging to or identifications of each terminal in the cloud service 310.

On the other hand, the system 300 may respectively include terminal interfaces 322, 332, data transmission interfaces 324, 334 and data storage units 326, 336 in the first terminal 320 and the second terminal 330. The terminal interfaces 322, 332 may be visualized interfaces configured to interact with the users, and the functions thereof may include but are not limit to data uploading, data vending, data purchasing, browsing transaction records and displaying exchanging data in a way of visualization. The data transmission interfaces 324, 334 are communicably connected between the terminal interfaces 322, 332 and the data storage units 326, 336 and capable of selectively constructing connections with the data operating unit 314. The data storage units 326, 336 may be plain filesystems or databases, and are configured to store original data the user would like to upload or sell and the encrypted data to be exchanged in data exchanging processes.

When the cloud service 310 confirms the first terminal 320 and the second terminal 330 participating in the data exchanging process, the central management unit 311 may establish the data operating unit 314 immediately. The data operating unit 314 is one-time and temporary, which means it is generated for the data exchanging process, and will be terminated when the data exchanging process ends, so that the security and confidentiality of the exchanging data are guaranteed. Then, the data operating unit 314 would generate a random encryption key, and the central management unit 311 may respectively transfer the encryption key to the first terminal 320 and the second terminal 330 through the connection management unit 312. When receiving the encryption key from the cloud service 310, the first terminal 320 may encrypt first original data to be exchanged and stored in the data storage unit 326 according to the encryption key to form first data through the terminal interface 322. Similarly, when receiving the encryption key from the cloud service 310, the second terminal 330 may encrypt second original data to be exchanged and stored in the data storage unit 336 according to the encryption key to form second data through the terminal interface 332.

Afterwards, the first terminal 320 and the second terminal 330 may respectively transfer the encrypted first data and second data to the cloud service 310. When receiving the first data and the second data, the cloud service 310 may transport the data into the data operating unit 314 for computing and operating. Specifically, the data operating unit 314 may respectively define subset data corresponding to a common identifier in the first data and the second data as first subset data and second subset data, and combine the first subset data and the second subset data to form result data. After that, the central management unit 311 may deliver the combined result data to the terminal that bought or asked for the result data, which is exemplary to be the first terminal 320 in the embodiment, through the connection management unit 312. When the result data is successfully delivered to the first terminal 320, the cloud service 310 will immediately terminate the data operating unit 314. Therefore, even the first terminal 320, the second terminal 330, the cloud service 310 itself or external terminals or personnel that did not participate in the data exchanging process are not able to access the data operating unit 314 or obtain any data related to the result data through the data operating unit 314. Moreover, since the first data and the second data have been encrypted when transferred to the cloud service 310, there is no risk of sensitive data breaches even if the data operating unit 314 is hacked by any external terminal or personnel before it is terminated. Accordingly, the security and confidentiality of the data exchanging process is guaranteed.

The system structure of the embodiment will be further illustrated in the following description. In general, the provider of the cloud service 310 may create each user's individual account and password, distribute them to the terminals of the users and store them in the terminal database 317 in the meanwhile. As one of the terminals, e.g., the first terminal 320, asks for login to the cloud service 310, the authentication unit 313 may send a token for login to the first terminal 320. The token will be deleted once the terminal logs out or the idle time exceeds a set time. Besides, each time the first terminal 320 send any command or request to the cloud service 310, the authentication unit 313 will verify the correctness and validity of the token, which makes the connection management unit 312 only permit commands or requests with valid token, and the safety of connections and data exchanging is confirmed.

For the central management unit 311, because the data exchanging processes handled by the cloud service 310 relate to large computing and connections with lots of terminals, errors would prone to occur. Hence, the state database 316 may record states of each initiation and completion of the steps or the operations. When the completion state of a certain step is recorded, the corresponding initiation state will be immediately removed from the state database 316. The service provider can thus rapidly and accurately obtain an overview of the ongoing data exchanging processes. The approach has the following advantages: (1) When actions done by a certain terminal affect other terminals (e.g., the other terminal exchanging data with the terminal), the central management unit 311 may transfer notice messages to related terminals through the connection management unit 312, so these terminals can get the notification through the terminal interfaces as they log in the service or execute the next operation, and the error will not continue to expand. (2) Once an error occurs during any process, the error would be written to the state database 316. The central management unit 311 may decide to inform the user for manual actions or retry automatically based on the type of the error, and the error can be excluded speedily.

For the connection management unit 312, the google remote procedure call (gRPC) may be introduced as the framework, so the connections may be effectively constructed in or across the data operating unit 314. Besides, the connection management unit 312 also has other functions, such as load-balancing, tracing, system health-checking and authentication, which are not limited to distinct OS environments of the terminals. It benefits various computing of computing services, terminals and backend services. In addition, a two-way transport layer security (TLS) protocol may be adopted for the connections and authentications, i.e., each authentication of the operations needs both the server certificate and the user terminal certificate, which contributes to profits to the security of sensitive data.

For the data operating unit 314, the most important principle is that the sensitive data must not leave or be left in the data operating unit 314 in unencrypted form. Therefore, the first data and the second data transferred respectively from the first terminal 320 and the second terminal 330 to the data operating unit 314 have been encrypted data of the sensitive data according to the encryption key. Moreover, the result data delivered from the data operating unit 314 to the first terminal 320 and/or the metadata database 315 has also been stored in encrypted form, and it can only be decrypted and restored to the original data by a terminal with a decryption key corresponding to the encryption key. In some embodiments, the method for exchanging data also includes executing a data protecting configuration to reject access to the data operating unit excepted from the first terminal, the metadata database and the second terminal. Despite the commands or the operations from the central management unit 311, they can be authenticated and executed only when the tokens of both the system and the user terminal are valid. Thereby, external malicious invasions or hacking to the cloud service 310 for control authority can be prevented to avoid the breaches of the sensitive data.

Referring to FIG. 4 through FIG. 6, FIG. 4 illustrates original data in a method for exchanging data according to some exemplary embodiments, FIG. 5 illustrates encrypted data encrypted from the original data in FIG. 4 according to some exemplary embodiments, and FIG. 6 illustrates result data formed by first subset data and second subset data in FIG. 5 according to some exemplary embodiments. The original data 400 may include the first original data 410 with the data IDs stored in the data storage unit 326, the emails and the locations of residence of the owners of the emails in the first terminal 320, and the second original data 420 with the data IDs stored in the data storage 336, the emails and the interests of the owners of the emails in the second terminal 330, wherein the emails are sensitive data through which the specific users can be recognized directly or indirectly. When the cloud service 310 respectively transfers the encryption key to the first terminal 320 and the second terminal 330, the original data 400 would be encrypted to the encrypted data 500 according to the encryption key by the first terminal 320 and the second terminal 330, i.e., the first data 510 and the second data 520 with encrypted contents filled in the email columns shown in FIG. 5.

Since the first terminal 320 and the second terminal 330 use the same encryption key to encrypt data, identical data of the emails in the first original data 410 and the second original data 420 keeps identical after encryption. Then, the first terminal 320 and the second terminal 330 may respectively transfer the first data 510 and the second data 520 to the cloud service 310. The data operating unit 314 may establish a data operating mechanism based on the first data 510 and the second data 520, and may define the encrypted contents in the first data 510 and the second data 520 as an identifier according to the data operating mechanism, e.g., the encrypted data filled in the email columns in the embodiment. Specifically, the contents filled in the email columns of the first original data 410 and the second original data 420 are not necessarily identical. For example, the columns of encrypted data in the first original data 410 are more or less than those in the second original data 420, or the data profiles of both are not totally the same. Therefore, after the data operating unit 314 respectively defines the encrypted email profiles in the first data 510 and the second data 520 as the identifiers, only the same identifier (encrypted data) will be defined as a common identifier, like the three rows in FIG. 5. The common identifier of the three rows is corresponding to the subset data including the common identifier itself and the locations in the first data 510, and is corresponding to the subset data including the common identifier itself and the interests in the second data 520.

Then, the data operating unit 314 may define the two subset data as first subset data and second subset data to executive the following steps.

Afterwards, the data operating unit 314 may combine the first subset data and the second subset data and assign a de-identified tag to the common identifier to form the result data 600. In some embodiments, the practical implementation to combine the subset data may be to inner join the data, and the name of the de-identified tag may be "Token" for example, but it is not limited thereto. Consequently, as shown in FIG. 6, the result data 600 includes the token column of a series of encrypted data and the locations and interests of the users corresponding to the encrypted data. The central management unit 311 may deliver the result data 600 to the first terminal 320 through the connection management unit 312, and terminate the data operating unit 314 and the entire data stored therein after successfully delivering the result data 600 to complete the data exchanging process.

In detail, the data transmission interface of each terminal may allow the user to upload several types of data including but not limited to a plain text file within delimiters to separate the content, e.g., a CSV file. Besides, the first terminal 320 and the second terminal 330 can determine the columns to be defined as the identifiers and whether the types of the identifiers should be defined as well while respectively transferring the first data 510 and the second data 520 to the cloud service 310. The approach is suitable for the following situations: (1) The user is lazy to manage his/her own data. (2) The user does not know how to utilize his/her own data and merely saves it.

In some embodiments, the functions of the terminal interface of each terminal may also include data normalization. Specifically, before or while the user stores the data into the data storage unit, the terminal interface may normalize the data, wherein the normalization includes but is not limited to changing all characters to half lowercases, adjusting variations of a word to a common spelling (e.g., adjusting "E-Mail" to "email") and using natural language processing (NLP) to correct spelling mistakes or stemming words.

In some embodiments, the method for exchanging data may also include establishing the data operating mechanism based on sample data provided by the first terminal. In detail, in order to reduce errors during data exchanging and make the obtained result data 600 closer to the pattern that the first terminal 320 can directly utilize, before or during the data exchanging process, the first terminal 320 may provide sample data to the cloud service 310. The sample data may include but not be limited to a genre and/or a format of the final desired data, or it can be a snapshot of the result data 600. After the cloud service 310 receives the sample data, the data operating unit 314 may establish the data operating mechanism according to the internal rules of the sample data automatically to increase the convenience for the first terminal 320 to use the result data 600.

It is noted that even if the first terminal 320 does not provide the sample data, the data operating unit 314 may also operate some simple calculations on the result data 600 voluntarily or based on the request from the first terminal 320, such as statistically analyzing the numbers of the common identifiers in the result data 600 or counting the genres of the locations and the interests.

Figure 7:
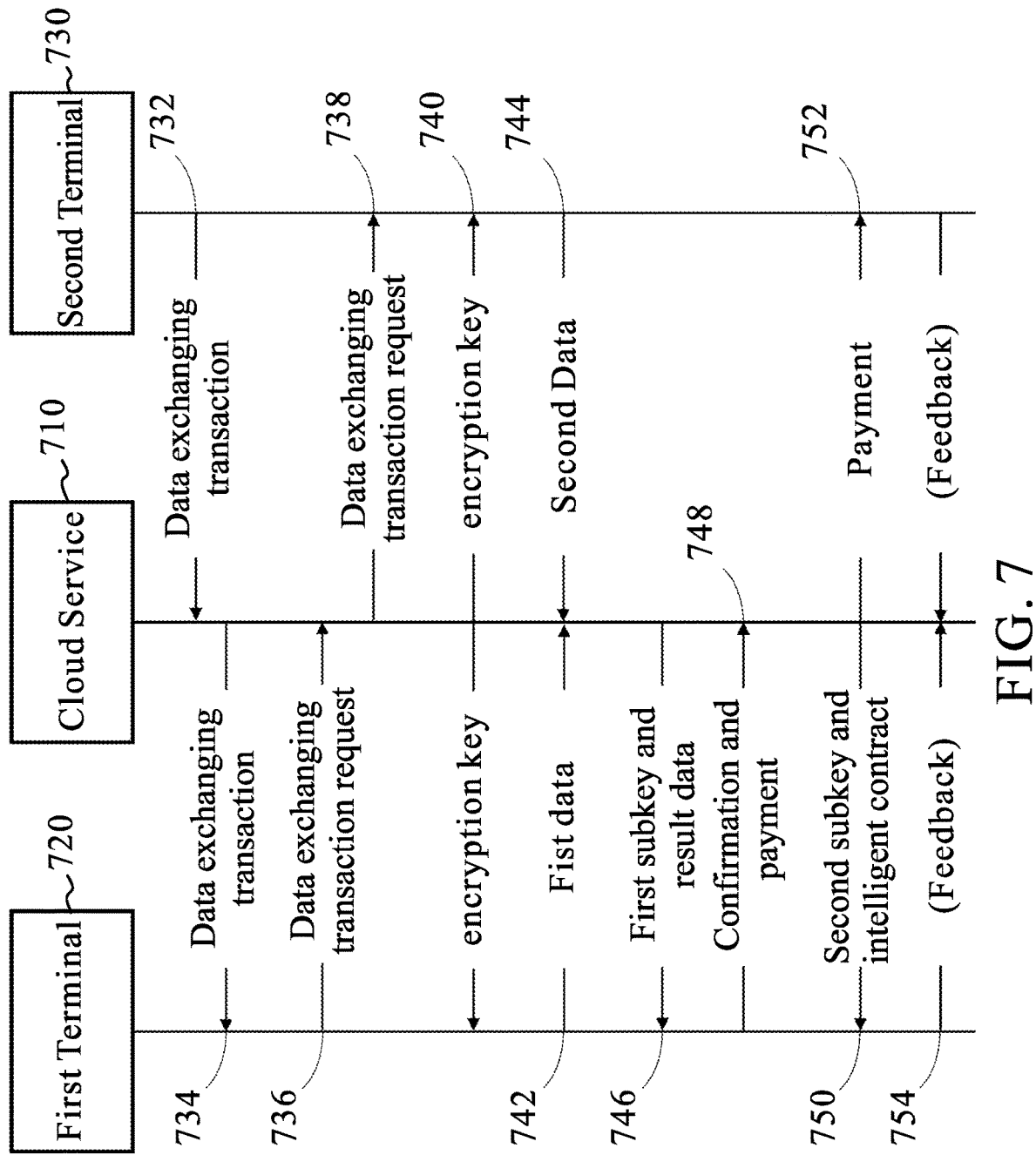
FIG. 7 is a flow diagram of a method for exchanging data according to some exemplary embodiments.
Figure 8:
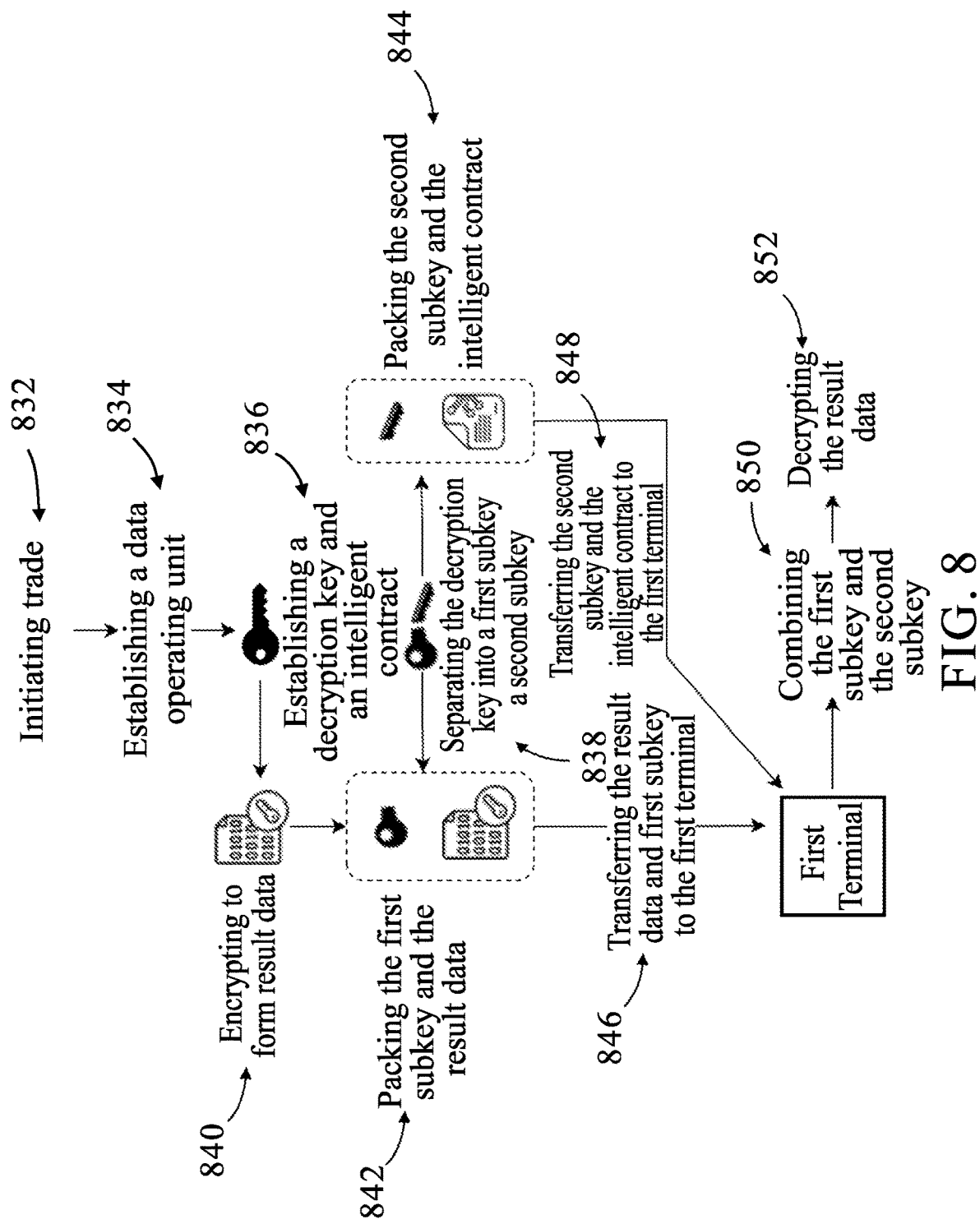
FIG. 8 is a flow diagram illustrates partial steps related to a decryption key and an intelligent contract in the method in FIG. 7 according to some exemplary embodiments.

Referring to FIG. 7 and FIG. 8, FIG. 7 is a flow diagram of a method for exchanging data according to some exemplary embodiments, and FIG. 8 is a flow diagram illustrates partial steps related to a decryption key and an intelligent contract in the method in FIG. 7 according to some exemplary embodiments. As shown in FIG. 7, the method for exchanging data can be executed in a commercial way and cooperatively performed by the cloud service 710 in charge of matching transactions and providing the platform for data exchanging, the first terminal 720 in charge of playing the role as a data buyer and providing partial data for combining, and the second terminal 730 in charge of playing a role as a data vendor providing data required by the buyer.

First, the second terminal 730 may provide a data exchanging transaction to the cloud service 710 (step 732) through the function of data vending in the terminal interface 332 or through browsing a reward posted by the first terminal 720. When receiving the data exchanging transaction notification provided by the second terminal 730, the cloud service 710 may immediately provide the data exchanging transaction to the first terminal 720 (step 734). When receiving the data exchanging transaction, the first terminal 720 may transfer a data exchanging transaction request to the cloud service 710 (step 736) through the function of data purchasing in the terminal interface 322. When receiving the data exchanging transaction request, the cloud service 710 may immediately transfer the data exchanging transaction request to the second terminal 730 (step 738) to confirm the data exchanging transaction requests of both the vendor and the buyer make a deal.

In some embodiments, the method for exchanging data may also include transferring a one-time certificate to a first trading terminal participating in the data exchanging transaction, receiving the one-time certificate from an undetermined terminal and authenticating the undetermined terminal as the first terminal. Specifically, the method for exchanging data allows the terminal that sent/received the data exchanging transaction request to be dissimilar to the terminal providing the data for exchanging. For example, when the first terminal 720 transfers the data exchanging transaction request to the cloud service 710, the cloud service 710 may define the terminal participating in the data exchanging transaction, i.e., the first terminal 720 as a first trading terminal, generate a one-time certificate through the authentication unit 313 and transfer the certificate to the first trading terminal. The first terminal 720 can choose to transfer the one-time certificate to another terminal or use the certificate by itself. When the first terminal 720 or another terminal is about to exchange data and transfers the one-time certificate to the cloud service 710, the cloud service 710 would authenticate the first undetermined terminal which sent the one-time certificate as the first terminal 720 which will participate in the data exchanging process and be responsible for transferring the first data 510 to the cloud service 710, and entitle the first terminal 720 to the power to receive or read the result data 600. Similarly, the second terminal 730 may also transfer the received one-time certificate to another terminal, and the cloud service 710 therefore authenticates the second undetermined terminal which sent the one-time certificate as the second terminal 730 responsible for transferring the second data 520 to the cloud service 710.

It is noted that the data operating mechanism established by the data operating unit 314 cannot be based only on the first data 510, the sample data provided by the first terminal 720 but also on the data chosen in the data exchanging transaction by the first trading terminal, wherein the data operating mechanism may include but not be limited to types, sizes and storing formats of the data.

When confirming both terminals performing the data exchanging, the cloud service 710 may respectively transfer the randomly generated encryption key to the first terminal 720 and the second terminal 730 (step 740). The first terminal 720 may encrypt the first original data 410 to form the first data 510 as shown in FIG. 4 and FIG. 5, and transfer the first data 510 to the cloud service 710 (step 742) after receiving the encryption key from the cloud service 710. Similarly, the second terminal 730 may encrypt the second original data 420 to form the second data 520, and transfer the second data 520 to the cloud service 710 (step 744) after receiving the encryption key from the cloud service 710.

In some embodiments, the method for exchanging data may also include establish a hashing mechanism and transferring the hashing mechanism to the first terminal, receiving first hashed data hashed according to the hashing mechanism from the first terminal, combining the first hashed data with second hashed data hashed according to the hashing mechanism and calculating a size of the intersection of the first hashed data and the second hashed data and transferring the size of the intersection to the first terminal. In detail, the data buyer (i.e., the first terminal 720) may wonder how much data can be obtained to utilize in the data exchanging process before the actual data exchanging process begins. Therefore, the cloud service 710 may respectively transfer the generated hashed mechanism to the first terminal 720 and the second terminal 730, calculate the size of the intersection of the first hashed data and the second hashed data hashed according to the hashing mechanism after receiving them from the first terminal 720 and the second terminal 730, and transfer the size of the intersection to the first terminal 720. Different from the actual encryption during the data exchanging process, since the hashing mechanism merely anonymizes the entire data that cannot be recovered, the calculated size of the intersection is not necessarily equal to that of the result data 600 the first terminal 720 can obtain finally. Nonetheless, it may also be a reference before the first terminal 720 trades the data.

In some embodiments, the method for exchanging data may also include calculating a size of the first data and transferring a payment request according to the size to the first terminal. Specifically, during conventional data exchanging processes, some unscrupulous vendors might use malicious cookies or the data generated by robot-generated invalid traffic (IVT) to exchange with buyers, so the data obtained by the buyers was filled with a lot of invalid contents. Moreover, the time costs and computing costs to terminate the data operating unit 314 are positively related to the size of the data stored therein. Therefore, the cloud service 710 may reasonably transfer various data cleaning payment requests to the first terminal 720 and the second terminal 720 respectively according to the sizes of the first data 510 and the second data 520. Since each data cleaning needs to pay a fee, this arrangement can effectively prevent the vendor or the buyer from using invalid data to exchange with others, and the efficiency of the data exchanging process and the quality of the result data 600 are thus enhanced.

In some embodiments, the method for exchanging data may also include transferring a permanent certificate to the first terminal, storing the result data into the metadata database, receiving a read request from the first terminal with the permanent certificate and constructing a communication protocol between the first terminal and the metadata database. Specifically, the method for exchanging data is capable of using a way of double authentication to confirm the correctness of the terminals providing the data and the terminal(s) receiving the result data 600. Taking the first terminal 720 for example, when authenticating the first undetermined terminal as the first terminal 720 participating in the data exchanging process according to the one-time certificate, the cloud service 710 may transfer the encryption key as well as a randomly generated permanent certificate to the first terminal 720. More specifically, after the first terminal 720 transfers the one-time certificate to the cloud service 710 for authentication, the one-time certificate will be immediately destroyed or become invalid, and cannot be used anymore. Therefore, in the following data exchanging process, regardless of transferring the first data 510 to the cloud service 710, receiving the result data 600 from the cloud service 710 and giving feedback to the cloud service 710 after the data exchanging process all need the permanent certificate to be authenticated and approved by the connection management unit 312 and the authentication unit 313.

In addition, the functions of the cloud service 710 may also include storing the result data for the first terminal to read without times limitation. In detail, based on the requirement of the first terminal 720, while the first data 510 and the second data 520 are combined in the data operating unit 314 to form the result data 600, the central management unit 311 may choose to merely transfer the result data 600 to the first terminal 720. Alternatively, if the first terminal 720 sends a read request to the cloud service 710 with the permanent certificate, the central management unit 311 may store the result data 600 into the metadata database 315 rather than directly transfer it to the first terminal 720, and permit the first terminal 720 to download the result data 600 from the metadata database 315 through a communication protocol constructed by the connection management unit 312 after the data operating unit 314 is terminated and/or the data exchanging process ends. Otherwise, the central management unit 311 can both directly transfer the result data 600 to the first terminal 720 and store a copy of the result data 600 into the metadata database 315 for the first terminal 720 to read or download the result data 600 anytime as it requires in the future. Since the result data 600 stored in the metadata database 315 keeps encrypted, the sensitive data will not be abused even if the cloud service 710 is hacked by malicious people.

In some embodiments, the method for exchanging data may also include transferring the result data to the first terminal synchronously as the result data is formed and transferring termination progress information to the first terminal. Specifically, if the first data 510 or the second data 520 is high volume, the user of the first terminal 720 would like to obtain the result data 600 as soon as possible. Therefore, the cloud service 710 may permit a direct connection between the data operating unit 314 and the data transmission interface(s) of the first terminal 720 and/or the second terminal 730 (i.e., the dotted line between each other shown in FIG. 3), and transfer the result data 600 to the first terminal 720 and/or the second terminal 730 as the result data 600 is formed. Then, the cloud service 710 selectively stores the result data 600 into the metadata database 315 and terminates the data operating unit 314. This approach has an advantage that a timely advertisement, e.g., a limited time promotion or a clearance sale, can be casted by the ad buyers as consumers browse the site, instead of being obtained after they finish the browsing. Hence, it benefits the marketing during a commercial rush hour. Besides, when the data operating unit 314 is terminated, the first terminal 720 and/or the second terminal 730 is able to monitor the real-time termination progress of the data operating unit 314 and confirm the provided data will not be abused or stolen.

In some embodiments, the method for data exchanging may also include modifying the data operating mechanism during the operation of combining the first subset data and the second subset data in the data operating unit to form the result data or during a plurality of data exchanging processes in which the first terminal participates, assigning a customized tag to a customized identifier of the first data and the second data respectively according to modified data operating mechanism and incorporating the customized identifiers and the customized tags among the first data and the second data into the result data 600.

As mentioned above, each user may have his/her own user account and password while using the cloud service 710. Therefore, the data operating mechanism established by the data operating unit 314 can be followed as it is suitable for the first terminal 720 to exchange other data to a great degree regardless of being based on the data chosen for trade by the first trading terminal or the sample data provided by the first terminal 720. Even if the current data exchanging process ends, the data operating mechanism corresponding to the first terminal 720 still can be saved and used in the next data exchanging process. On the other hand, although the first data 510 and the second data 520 can be normalized by the terminal interfaces 322, 332 before transferred to the cloud service 710 to enhance chances of being recognized and utilized by the data operating unit 314, there may still be unrecognizable content that is regarded as noise by the data operating unit 314. Nevertheless, when the volume of the data exchanged in a single data exchanging process is high enough, or the first terminal 720 has performed a plurality of data exchanging processes, the data operating unit 314 is capable of modifying the established data operating mechanism through a way of such as machine learning. Thereby, the modified data operating mechanism may try to fine-tune or assign a customized tag to the noise that cannot be recognized or utilized initially without changing the essentiality of the data, so that the data may become a customized identifier which would have practical value to the first terminal 720. Afterwards, the customized identifier and the customized tag may be incorporated into the result data 600 and provided to the first terminal 720 as well. For example, the first data 510 shown in FIG. 5 may further include a column of "ages", and the second data 520 may further include a column of "year old". These two columns of data initially may not be recognized to share the same property literally, but the data operating unit 314 may learn that these columns have similar operating rules and logic during data exchanging. Therefore, the data operating unit 314 may try to assign customized tags and customized identifiers respectively to the columns and the data thereof. The data related to "age" will thus be presented in the result data 600 and transferred to the first terminal 720.

Please refer to FIG. 7 and FIG. 8 again. In some embodiments, the method for exchanging data may also include establishing a decryption key and an intelligent contract, separating the decryption key into a first subkey and a second subkey, transferring the result data and the first subkey to the first terminal and transferring the intelligent contract and the second subkey to the first terminal after receiving a confirmation message and/or a payment notification from the first terminal. Specifically, in order to certify that the cloud service 710 can be an unbiased third-party platform in every data exchanging transaction and that the data vendor and buyer are able to get the required data and rewards after the transaction, the method for exchanging data in this embodiment introduces an intelligent contract as a tool for the vendor and buyer to fulfill the agreement and verify the identification. More specifically, when the data exchanging process begins, the cloud service 710 may initiate the trade (step 832) and establish the data operating unit 314 (step 834). As the data operating unit 314 establishes the encryption key, it may also establish an intelligent contract and a decryption key corresponding to the encryption key simultaneously (step 836). In other words, the terminal obtaining the result data 600 needs the decryption key to decrypt the encrypted result data 600 to utilizable the data. Then the cloud service 710 may separate the decryption key into a first subkey a second subkey (step 838), combine the first data 510 and the second data 520 to form the encrypted result data 600 through the data operating unit 314 (step 840), pack the first subkey and the result data 600 to a package (step 842), and pack the second subkey and the intelligent contract to another package (step 844). Meanwhile, the cloud service 710 may transfer the packed first subkey and result data 600 to the data buyer, i.e., the first terminal 720 (steps 746 and 846). Although the first terminal 720 gets the first subkey and the result data 600, the result data 600 still cannot be decrypted or utilized as the second subkey is lacked. However, it is enough for the first terminal 720 to confirm that the operated result data 600 is received. Therefore, after the provider of the cloud service 710 receives the confirmation and payment made by the first terminal 710 (step 748), the cloud service 710 may transfer the remaining second subkey and intelligent contract to the first terminal 720 (steps 750 and 848), and make the payment of fees obtained by the second terminal 730 for vending the data deducting the service charge required for providing the data exchanging transaction to the second terminal 730 (step 752). When the first terminal 710 receives the second subkey and the intelligent contract, it may combine the first subkey and the second subkey to restore the decryption key required for decryption (step 850). Besides, the intelligent contract is configured to verify the identification while decryption, which allows the first terminal 720 to successfully decrypt the result data 600 (step 852). Afterwards, the first terminal 720 and the second terminal 730 may optionally transfer feedback to the cloud service 710 about the data exchanging transaction respectively (step 754), wherein the feedback of the first terminal 720 (the data buyer) may include modification suggestions to the data operating mechanism, such as the threshold which needs to be exceeded by the number of pieces of data to transfer, the error of assigning the customized tag, and so on. The cloud service 710 can accordingly modify the data operating mechanism based on the feedback to improve the next data exchanging process.

Figure 9:
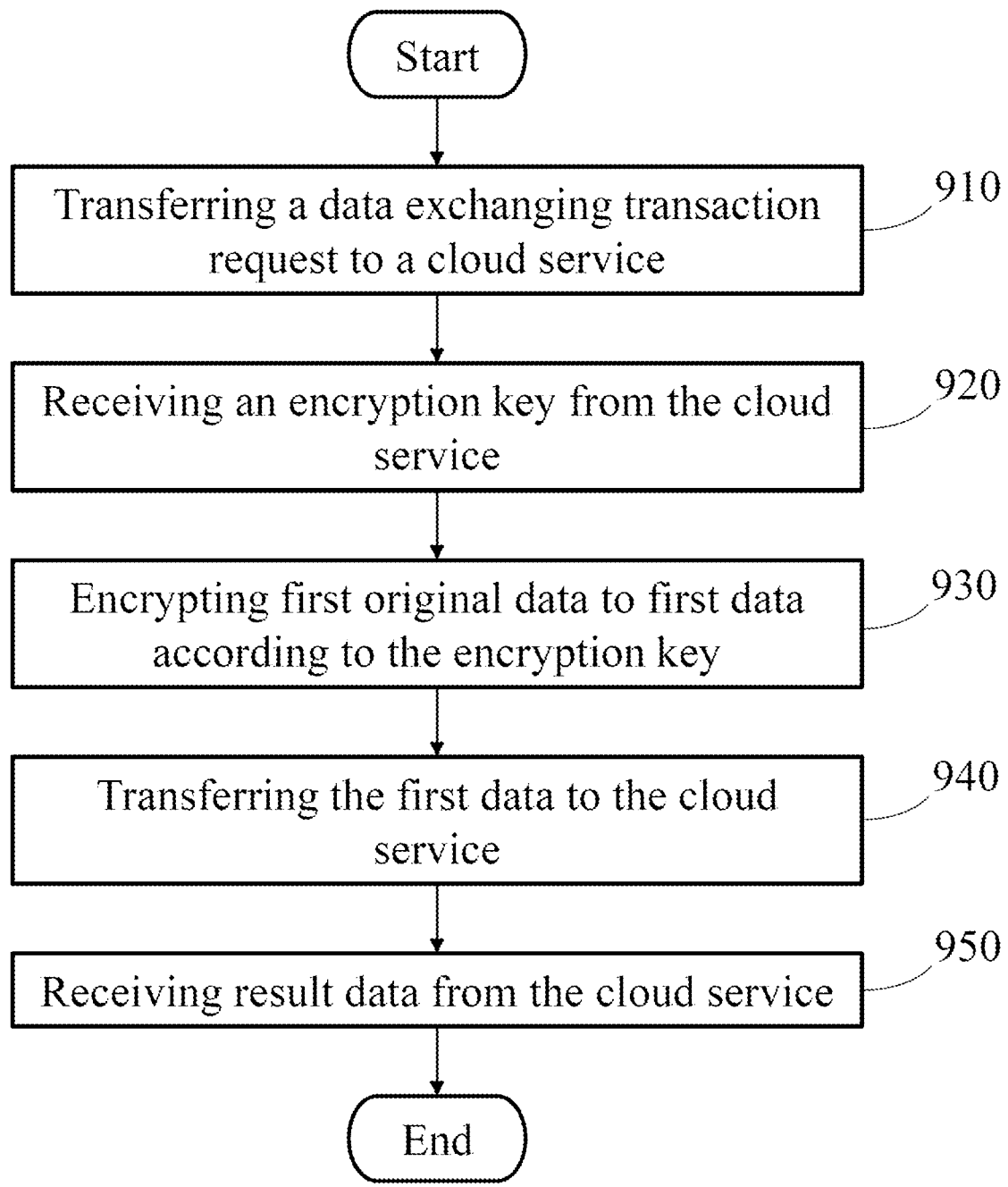
FIG. 9 is a block diagram of another method for exchanging data according to some exemplary embodiments.

Referring to FIG. 9, FIG. 9 is a block diagram of another method for exchanging data according to some exemplary embodiments. As shown in FIG. 9, another method for exchanging data is also disclosed for the terminal to perform data exchanging. The method may include transferring a data exchanging transaction request to a cloud service (step 910), receiving an encryption key from the cloud service (step 920), encrypting first original data to first data according to the encryption key (step 930), transferring the first data to the cloud service (step 940) and receiving result data from the cloud service (step 950). Through the method for exchanging data, a user is able to transfer the encrypted first data 510 to the cloud service 710, and obtain the result data 600 after the operations of the cloud service 710. Because the first data 510 transferred to the cloud service 710 has been encrypted, even if the cloud service 710 is hacked by malicious people, breaches of the sensitive data can be avoided to improve the protection during exchanging data.

Besides, a non-transitory computer readable medium having stored therein instructions is also disclosed. When a computing device executes the instructions, the instructions cause the computing device to perform the above methods for exchanging data. It is noted that the non-transitory computer readable medium may include but not be limited to register memory, processor cache, random access memory (RAM), read only memory (ROM), optical or magnetic disks, compact-disc read only memory (CD-ROM), USB disks or hard disks, and the computing device may be a laptop, a personal computer, an industrial computer, a commercial computer, a work station, a server, a computer cluster, a portable electronic device, and so on.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for performing a data exchanging process to exchange data, comprising the following steps:
   establishing a data operating unit;
   transferring an encryption key to a first terminal;
   receiving first data encrypted according to the encryption key from the first terminal;
   combining first subset data of the first data and second subset data of second data encrypted according to the encryption key in the data operating unit to form result data, wherein the first subset data and the second subset data respectively have a common identifier;
   delivering the result data to the first terminal; and
   terminating the data operating unit.

2. The method according to claim 1, further comprising the following steps:
   providing a data exchanging transaction;
   transferring a one-time certificate to a first trading terminal participating in the data exchanging transaction;
   receiving the one-time certificate from an undetermined terminal; and
   authenticating the undetermined terminal as the first terminal.

3. The method according to claim 2, further comprising the following step:
   establishing a data operating mechanism based on data chosen for trade in the data exchanging transaction by the first trading terminal or sample data provided by the first terminal;
   wherein the step of combining the first subset data and the second subset data in the data operating unit to form the result data comprises:
      defining an encrypted content of the first data and the second data as an identifier respectively;
      defining an identical identifier among the first data and the second data as the common identifier and defining subset data corresponding to the common identifier of the first data and the second data as the first subset data and the second subset data respectively; and
      combining the first subset data and the second subset data, and assigning a de-identified tag to the common identifier to form the result data.

4. The method according to claim 3, further comprising the following steps:
   modifying the data operating mechanism during the step of combining the first subset data and the second subset data in the data operating unit to form the result data or during a plurality of data exchanging processes in which the first terminal participates;
   assigning a customized tag to a customized identifier of the first data and the second data respectively according to modified data operating mechanism; and
   incorporating the customized identifiers and the customized tags among the first data and the second data into the result data.

5. The method according to claim 1, wherein the step of transferring the encryption key to the first terminal comprises:
   transferring a permanent certificate to the first terminal;
   wherein the step of delivering the result data to the first terminal comprises:
      storing the result data into a metadata database;
      receiving a read request from the first terminal with the permanent certificate; and
      constructing a communication protocol between the first terminal and the metadata database.

6. The method according to claim 5, further comprising the following step:
   executing a data protecting configuration to reject access to the data operating unit excepted from the first terminal, the metadata database and a second terminal providing the second data.

7. The method according to claim 1, further comprising the following steps:
   establishing a decryption key and an intelligent contract; and
   separating the decryption key into a first subkey and a second subkey;
   wherein the step of delivering the result data to the first terminal comprises:
      transferring the result data and the first subkey to the first terminal; and
      transferring the intelligent contract and the second subkey to the first terminal after receiving a confirmation message and/or a payment notification from the first terminal.

8. A non-transitory computer-readable medium having stored therein instructions that, when executed by a computing device, cause the computing device to perform operations comprising:
   establishing a data operating unit;
   transferring an encryption key to a first terminal;
   receiving first data encrypted according to the encryption key from the first terminal;
   combining first subset data of the first data and second subset data of second data encrypted according to the encryption key in the data operating unit to form result data, wherein the first subset data and the second subset data respectively have a common identifier;
   delivering the result data to the first terminal; and
   terminating the data operating unit.

9. The non-transitory computer-readable medium according to claim 8, wherein the operations further comprise:
   providing a data exchanging transaction;
   transferring a one-time certificate to a first trading terminal participating in the data exchanging transaction;
   receiving the one-time certificate from an undetermined terminal; and
   authenticating the undetermined terminal as the first terminal.

10. The non-transitory computer-readable medium according to claim 9, wherein the operations further comprise:
  establishing a data operating mechanism based on data chosen for trade in the data exchanging transaction by the first trading terminal or sample data provided by the first terminal;
  defining an encrypted content of the first data and the second data as an identifier respectively;
  defining an identical identifier among the first data and the second data as the common identifier and defining subset data corresponding to the common identifier of the first data and the second data as the first subset data and the second subset data respectively; and
  combining the first subset data and the second subset data, and assigning a de-identified tag to the common identifier to form the result data.

11. The non-transitory computer-readable medium according to claim 10, wherein the operations further comprise:
  modifying the data operating mechanism during the operation of combining the first subset data and the second subset data in the data operating unit to form the result data or during a plurality of data exchanging processes in which the first terminal participates;
  assigning a customized tag to a customized identifier of the first data and the second data respectively according to modified data operating mechanism; and
  incorporating the customized identifiers and the customized tags among the first data and the second data into the result data.

12. The non-transitory computer-readable medium according to claim 8, wherein the operations further comprise:
  transferring permanent certificate to the first terminal;
  storing the result data into a metadata database;
  receiving a read request from the first terminal with the permanent certificate; and
  constructing a communication protocol between the first terminal and the metadata database.

13. The non-transitory computer-readable medium according to claim 8, wherein the operations further comprise:
  establishing a decryption key and an intelligent contract;
  separating the decryption key into a first subkey and a second subkey;
  transferring the result data and the first subkey to the first terminal; and
  transferring the intelligent contract and the second subkey to the first terminal after receiving a confirmation message and/or a payment notification from the first terminal.

14. A system comprising:
  a processor; and
  a memory coupled to the processor and configured to store instructions executable by the processor to cause the processor to perform operations comprising:
    establishing a data operating unit;
    transferring an encryption key to a first terminal;
    receiving first data encrypted according to the encryption key from the first terminal;
    combining first subset data of the first data and second subset data of second data encrypted according to the encryption key in the data operating unit to form result data, wherein the first subset data and the second subset data respectively have a common identifier;
    delivering the result data to the first terminal; and
    terminating the data operating unit.

15. The system according to claim 14, wherein the operations further comprise:
  providing a data exchanging transaction;
  transferring a one-time certificate to a first trading terminal participating in the data exchanging transaction;
  receiving the one-time certificate from an undetermined terminal; and
  authenticating the undetermined terminal as the first terminal.

16. The system according to claim 15, wherein the operations further comprise:
  establishing a data operating mechanism based on data chosen for trade in the data exchanging transaction by the first trading terminal or sample data provided by the first terminal;
  defining an encrypted content of the first data and the second data as an identifier respectively;
  defining an identical identifier among the first data and the second data as the common identifier and defining subset data corresponding to the common identifier of the first data and the second data as the first subset data and the second subset data respectively; and
  combining the first subset data and the second subset data, and assigning a de-identified tag to the common identifier to form the result data.

17. The system according to claim 16, wherein the operations further comprise:
  modifying the data operating mechanism during the operation of combining the first subset data and the second subset data in the data operating unit to form the result data or during a plurality of data exchanging processes in which the first terminal participates;
  assigning a customized tag to a customized identifier of the first data and the second data respectively according to modified data operating mechanism; and
  incorporating the customized identifiers and the customized tags among the first data and the second data into the result data.

18. The system according to claim 14, wherein the operations further comprise:
  transferring a permanent certificate to the first terminal;
  storing the result data into a metadata database;
  receiving a read request from the first terminal with the permanent certificate; and
  constructing a communication protocol between the first terminal and the metadata database.

19. The system according to claim 18, wherein the operations further comprise:
  executing a data protecting configuration to reject access to the data operating unit excepted from the first terminal, the metadata database and a second terminal providing the second data.

20. The system according to claim 14, wherein the operations further comprise:
  establishing a decryption key and an intelligent contract;
  separating the decryption key into a first subkey and a second subkey;
  transferring the result data and the first subkey to the first terminal; and
  transferring the intelligent contract and the second subkey to the first terminal after receiving a confirmation message and/or a payment notification from the first terminal.

* * * * *